July 30, 1963 — A. R. PERRINS — 3,099,789
VOLTAGE SURGE PROTECTION NETWORK
Filed Feb. 26, 1960
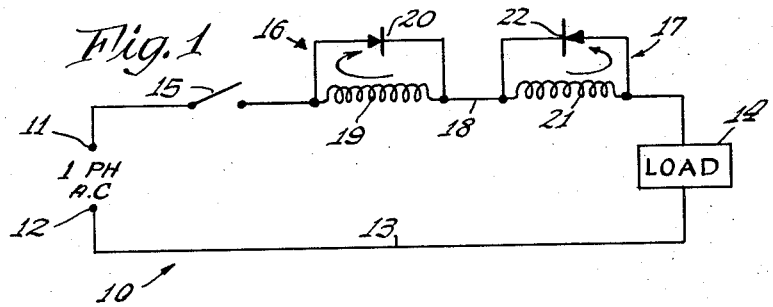
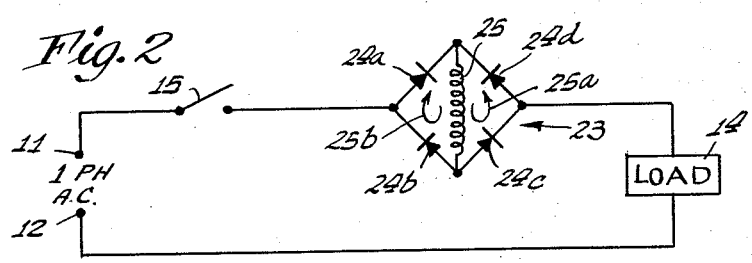
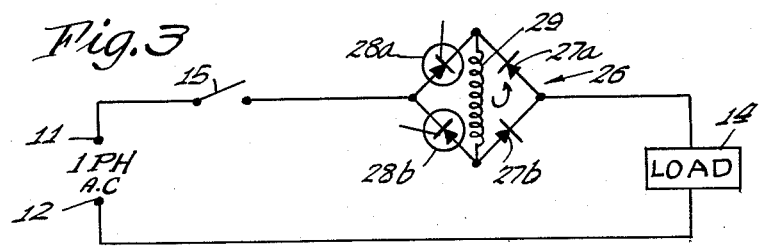
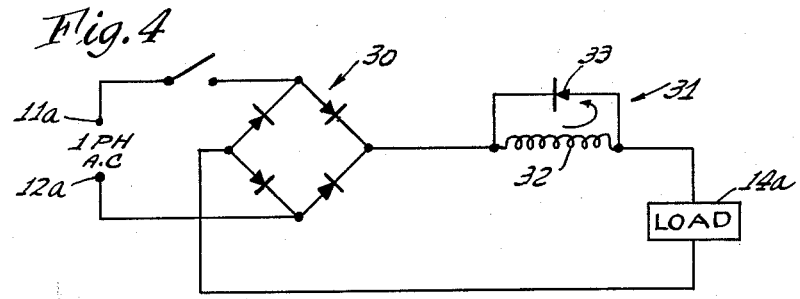
INVENTOR.
Allen R. Perrins
BY
Johnson and Kline
ATTORNEYS United States Patent Office 3,099,789
Patented July 30, 1963

3,099,789
VOLTAGE SURGE PROTECTION NETWORK
Allen R. Perrins, Cheshire, Conn., assignor to The Superior Electric Company, Bristol, Conn., a corporation of Connecticut
Filed Feb. 26, 1960, Ser. No. 11,374
2 Claims. (Cl. 323—9)

The present invention relates to an electric circuit having a load connected to a source of electrical energy and more particularly to a rate of change of current limiting device connected in the circuit which decreases the abruptness of a change of current to the load.

In many electric circuits having a load energized from a source of electrical energy, protective devices are included for the purpose of limiting the value of inrush, overload or fault current, i.e. current which instantly increases in value from its previous value (including no current flow) as determined by the parameters of the circuit to a higher value that may be detrimental to the components in the circuit. Most protective devices, however, do not function instantaneously, requiring a short time before acting to limit the load current in the circuit or to open the circuit. However, prior to their functioning, instantaneous current changes may destroy or damage components to cause malfunctioning of the circuit.

One approach to overcoming this problem is to limit the maximum load current which may flow in the circuit, as by a resistance, but to be effective during changes it would require a value which would seriously effect the steady state performance of the circuit by causing, for example, high voltage and power losses. Another solution is the employment of an inductive impedance in series with the circuit but for it to limit the current changes reasonably effectively, it must have an impedance value that causes power losses, voltage drops, counter voltages, etc. which are of sufficient magnitude to reduce the effectiveness of the circuit during its steady state condition.

An object of the present invention is to provide an electric circuit in which the rate of change of the value of load current in the circuit is decreased and prevented from being instantaneous.

Another object of the present invention is to achieve the above object in an electric circuit with negligible effect on the steady state operation of the circuit and with only a few components that are relatively economical and free from malfunctioning.

A further object of the present invention is to provide in an electric circuit for a rate of change of current limiting device which during steady state conditions of the circuit has an impedance of small value but when the current in the circuit rises above its previous steady state value, the device becomes an impedance of high value that limits the rate of increase of the current until it reaches its new steady state value.

In carrying out the present invention, the rate of change of current limiting device is included as an individual device in an existing electric circuit which has an electric energy utilizable device and/or components, herein referred to as a load, to limit the rate of change in load current. The limiting device includes an inductor and connected thereacross one-way valve means with the device being inserted in series between the input terminals and the load of the circuit. Upon initial energization of the circuit which causes the load current to increase from the zero or its unenergized value, to its normal or steady state value, the inductor is included in the electric circuit and constitutes a substantially inductive load which limits the rate of increase of the current. When the current has reached its steady state value, the inductor is, in effect, removed from the circuit by the one-way valve being made conductive in a backward or reverse direction for values of load current below its steady state value but for any increase in value above this, the one-way valve means becomes non-conductive to the increase in load current and forces the increasing load current to flow through the inductor thereby limiting the rate of change of the increasing current. Thus the limiting device in the electric circuit functions as if there were switches in which the inductor is switched into the electric circuit whenever the load current therein is increasing beyond its steady state value and switched out with a small sub-substantially resistive impedance substituted therefor for values of load current below its steady state value wtih the inductor being switched back into the circuit whenever the load current starts to rise above its steady state value.

Other features and advantages will hereinafter appear.

In the drawing:

FIGURE 1 is a schematic diagram of an electric circuit embodying the present invention in which alternating current is supplied from the source to the load.

FIG. 2 is a schematic diagram of a further embodiment also energizing the load with alternating current.

FIG. 3 is a schematic diagram of another embodiment of the present invention in which silicon controlled rectifiers are employed to control the value of alternating current in the electric circuit.

FIG. 4 is a schematic diagram of an electric circuit having the present invention incorporated therein but where unidirectional pulsating current energizes the load.

Referring to FIG. 1, the electric circuit which includes the present invention is indicated by the reference numeral 10 and includes a pair of input terminals 11 and 12. A lead 13 connects the input terminal 12 to a load 14 and the input terminal 11 is connected through a switch 15 and a first rate of change of current limiting device 16 and a second limiting device 17 to the load by a lead 18.

In the schematic diagram of the embodiment shown in FIG. 1 indicated, the terminals 11 and 12 are connectible to a source of single phase alternating current, such as the usual 120 volt 60 cycle household current. The load is schematically illustrated in view of it being unessential to the present invention the type of load that is in the electric circuit except for the necessity of protecting the load and/or other components in the circuit from abrupt increases in current.

The protective device 16 consists of an inductance 19 and a one-way valve means 20 connected across the inductance while the protective device 17 has an inductance 21 and a one-way valve means 22. The inductances 19 and 21 are preferably identical and the one-way valves 20 and 22 are also identical with the exception that the valve 20 is connected to conduct in a direction of load current flow to the terminal 12 while the valve 22 conducts in the direction of load current flow to the terminal 11.

In the operation of the limiting device 17 in FIG. 1, the switch 15 is open and is assumed to be closed when the alternating current at the terminal 11 is positive and at the start of its cycle. Load curent will then flow through the one-way valve 20, is forced by the one-way valve 22 to flow through the inductor 21 and then through the load to the terminal 12. The inductance 21 has a size and a "Q" which constitutes a substantially inductive impedance of relatively high value in the circuit and therefore limits the increasing load current by its impedance in the load circuit. By being a substantially inductive impedance, a voltage drop is produced across it by the rate of change of current flowing through it and this voltage drop decreases the voltage available from the source across the load and hence limits the load current. The load current will increase as long as the voltage available from the source is greater than the voltage drop across the load and at the instant when these voltages are equal the counter E.M.F. across the inductor is zero. As the instantaneous source voltage decreases, the load current decreases, and this causes the inductor to have a small induced voltage of a polarity opposite to its counter E.M.F. at its terminals which produces a voltage across the one-way valve means that causes current to circulate through the one-way valve means and the inductor in the direction of the arrow. The value of the circulating current in the one-way valve means, under theoretically ideal conditions will increase as the load current decreases until when the load current is instantaneously zero, the value of circulating current is equal to that value of the load current at the instant when the load voltage drop equaled the voltage at the source.

During the next current pulse when the source voltage current is positive at the terminal 11, load current will in effect pass backwardly through the one-way valve 22 until it equals the circulating current in value but the portion of the load current higher than the value of the circulating current is blocked by the one-way valve 22 and is forced through the inductor 21. This inserts the inductor 21 in the electric circuit which will limit the rate of rise of the load current since it is a substantially inductive impedance of relatively high value. This second pulse, however, will create in the inductor 21 a higher energy state which in turn will produce a higher value of circulating current which in turn enables a subsequently higher value of load current to pass backwardly through the one-way valve 22.

After a number of pulses, preferably two or more depending upon the value of the inductance and its relationship to circuit values, the circulating current will be substantially equal to the peak steady state value of the load current. The inductor tries to maintain the total value of current flowing through it constant and in the same direction, whether it be just the load current, just the circulating current or the sum of the two. For values of load current less than the value of inductor current, the device presents only a substantially resistive impedance of small value in the electric circuit but whenever the value of load current starts to increase beyond the inductor current, the device presents a substantially inductive impedance in the circuit to the load current above this value but when the value of the inductor current is raised to the increased level value of load current, the device again presents a substantially resistive impedance of low value in the circuit.

When load current is flowing in the other direction and the terminal 12 is positive, a similar operation will occur in the limiting device 16 so that there will be set up a circulating current as indicated by its associated arrow.

It will be clear that when the terminal 11 is positive, the current through the one-way valve 20 at any instant, will be substantially equal to the load current plus the circulating current in the device 16, while the current through the one-way valve 22 will be the circulating current less the load current. With changes in polarity of the input terminals, the values of current through the one-way valves will be interchanged.

While the above refers to an ideally operative circuit, practically, there is voltage drop through the one-way valves and iron and copper losses in the inductor and hence while it is desirable to have the circulating current be maintained equal to the peak steady state value of load current, it only approaches its theoretical value when the load current is at its peak and when load current is somewhat less than this, the above substantially resistive losses in the device produce a slight decay in the circulating current which must be restored by the load current.

Referring to FIG. 2, there is shown a further embodiment of the present invention in which only one inductor is employed. Terminals 11 and 12, switch 15, load 14 and rate of change of current limiting device 23 are provided with the device 23 being independent of the load but being inserted in series therewith. It consists of a bridge having one-way valves 24a, 24b, 24c and 24d conducting in the direction shown and an inductor 25 connected between opposite terminals of the bridge. In this schematic diagram of a circuit, the source is alternating current and the load is energized by A.C.

Under steady state conditions, the circulating currents produced by the counter E.M.F. of the inductor 25 circulate in the direction of the arrows 25a and 25b with their values being determined by the relative resistances of their paths. Thus when the terminal 11 is positive, load current flows in effect backwardly through the one-way valves 24b and 24d and forwardly through the valves 24a and 24c and thus the current in the valves 24a and 24c is the load current added to the circulating currents while in the one-way valves 24b and 24d the current therethrough is the circulating currents less the load currents. If the load current should increase, when it starts to rise above its peak steady state value (which is substantially the value of the sum of the circulating currents) it becomes larger than the circulating currents and hence cannot all flow backwardly through the valves 24b and 24d. The portion of the load current higher than the circulating current is thus forced through the inductor 25 to thereby have its increasing rate of change limited.

With this embodiment of the invention as in the previous embodiment, the current which flows through the inductor is always in the same direction even though the load is energized by alternating current.

In FIG. 3 there is shown a further embodiment of the present invention, somewhat similar to that schematically shown in FIG. 2, and thus there are terminals 11 and 12 connected to a source of A.C. and a load 14 energized by alternating current. The rate of change of current limiting device in this embodiment of the invention consists of a bridge 26 having one-way valves 27a and 27b and silicon controlled rectifiers, which are controllable one-way valves, 28a and 28b. An inductor 29 is connected across opposite terminals of the bridge. It will be appreciated that the bridge in this circuit functions in a similar manner to that shown in FIG. 2 with the exception that the silicon controlled rectifiers will serve to control the value of the load current by voltage applied to the gates of the silicon controlled rectifiers.

FIG. 4 is a further embodiment of the present invention in which there are terminals 11a and 12a connected to a source of alternating current with a load 14a energized by pulsating unidirectional current from a full-wave rectifier 30. Alternating current from the terminals 11a and 12a is rectified by the bridge 30 and led as a pulsating unidirectional current to the load 14a. Positioned in series with the load is a rate of change of current limiting device 31 consisting of inductor 32 and a one-way valve 33. The load current flow during steady state conditions will cause a circulating current to flow in the limiting device as indicated by the arrow. This device functions in the same manner as the other devices heretofore described, in that values of load current less than the circulating current will flow in effect backwardly through the one-way valve 33, while any increase thereover flows through the inductor 32 and thereby has its rate of change limited.

While in the specific embodiments of the invention described semi-conductor diodes have been illustrated as the one-way valve means, it will be understood that other electrical devices that permit current flow in only one direction may be employed, such as thyratron tubes. Moreover, the one-way valve means may consist of a number of values connected in parallel, if desired.

It will be clear from the previous embodiments of the invention that the device of the present invention of the inductor and the one-way valve means forms a path in which there is a circulating current, the value of which is substantially equal to the peak steady state value of the load current. For values of load current equal to or less than the circulating current, the only power loss caused in the circuit is small, being the losses through the valves and the losses in the inductor, and hence are a substantially resistive impedance power loss. However, whenever the load current starts to rise above the circulating current, the portion thereof above the value of the circulating current is forced through the inductor and hence a substantially inductive impedance of relatively high value is inserted in the circuit to limit the rate of change of the load current. Moreover whenever the load current increases, it causes an increase in the value of circulating current until the circulating current approximates the new peak steady state value of load current in the circuit. With decreases in current there is no effect on the load by the rate of change of current limiting device since the circulating current decays in the device, the time to decay being determined by the "Q" of the device, and not in the electric circuit having the load.

Variations and modifications may be made within the scope of the claims and portions of the improvements may be used without others.

I claim:

1. In an electric circuit having a pair of input terminals connectible to a source of electrical energy and a load energized by a load current from the source, the improvement comprising an inductor and one-way valve means connected in series between the load and the input terminals to provide a path for unidirectional current flowing in the inductor, said inductor and means forming a substantially resistive impedance for values of load current less than the value of current in the inductor and forming a substantially inductive impedance for values of load current at least equal to the value of current in the inductor and in which the load current is alternating current and there are two inductors, each with one-way valve means connected thereacross, said one-way valve means being connected to conduct in opposite directions.

2. In an electric circuit having a pair of input terminals connectible to a source of electrical energy and a load energized by a load current from the source, the improvement comprising an inductor and one-way valve means connected in series between the load and the input terminals to provide a path for unidirectional current flowing in the inductor, said inductor and means forming a substantially resistive impedance for values of load current less than the value of current in the inductor and forming a substantially inductive impedance for values of load current at least equal to the value of current in the inductor and in which the load current is alternating current, the one-way valve means includes a bridge having two pairs of adjacent legs with a controlled rectifier in each leg, the inductor being connected to each junction of the pair of adjacent legs, and the controlled rectifiers in one pair of adjacent legs being connected to be conducting toward their junction and the one-way valve means in the other pair of adjacent legs being connected to be conducting away from their junction, and other terminals of the bridge being connected to the electric circuit.

References Cited in the file of this patent

UNITED STATES PATENTS

| | | |
|---|---|---|
| 2,858,433 | Rector | Oct. 28, 1958 |
| 2,889,511 | Bedford et al. | June 2, 1959 |
| 2,911,586 | Zelina | Nov. 3, 1959 |

FOREIGN PATENTS

| | | |
|---|---|---|
| 358,083 | England | Sept. 28, 1931 |